US012163359B2

(12) United States Patent
Schiffer et al.

(10) Patent No.: US 12,163,359 B2
(45) Date of Patent: Dec. 10, 2024

(54) DOOR LOCK, IN PARTICULAR MOTOR VEHICLE DOOR LOCK

(71) Applicant: Kiekert AG, Heiligenhaus (DE)

(72) Inventors: Holger Schiffer, Meerbusch (DE); Michael Scholz, Essen (DE); Ömer Inan, Dorsten (DE); Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 319 days.

(21) Appl. No.: 17/620,175

(22) PCT Filed: May 15, 2020

(86) PCT No.: PCT/DE2020/100425
§ 371 (c)(1),
(2) Date: Jan. 5, 2022

(87) PCT Pub. No.: WO2020/259740
PCT Pub. Date: Dec. 30, 2020

(65) Prior Publication Data

US 2022/0364394 A1 Nov. 17, 2022

(30) Foreign Application Priority Data

Jun. 25, 2019 (DE) ..................... 10 2019 117 053.2

(51) Int. Cl.
*E05B 77/40* (2014.01)
*E05B 77/36* (2014.01)
(Continued)

(52) U.S. Cl.
CPC .............. *E05B 77/40* (2013.01); *E05B 77/36* (2013.01); *E05B 77/38* (2013.01); *E05B 83/36* (2013.01)

(58) Field of Classification Search
CPC .......... E05B 77/36; E05B 77/38; E05B 77/40; E05B 77/42; E05B 17/0041; E05B 17/0045; E05B 17/007
See application file for complete search history.

(56) References Cited

U.S. PATENT DOCUMENTS 5,308,128 A * 5/1994 Portelli .................. E05B 77/38 292/216
6,789,825 B2 * 9/2004 Kalargeros ............. E05B 77/38 292/201
(Continued)

FOREIGN PATENT DOCUMENTS

DE 202008012707 U1 * 1/2009 ............. E05B 77/40
DE 102008014405 A1 5/2009
(Continued)

OTHER PUBLICATIONS

International Search Report mailed Sep. 10, 2020, for priority International Patent Application No. PCT/DE2020/100425.

*Primary Examiner* — Christine M Mills
*Assistant Examiner* — Noah Horowitz
(74) *Attorney, Agent, or Firm* — Renner, Otto, Boisselle & Sklar, LLP

(57) ABSTRACT

A door lock, in particular a motor vehicle door lock. This lock is provided with a locking mechanism substantially formed by a rotary latch and at least one pawl. A lever chain is also provided for directly or indirectly acting on the locking mechanism. The lever chain has at least one actuation lever and an actuated lever optionally acted upon by the actuation lever. In addition, at least one damping element is created for the lever chain. According to the invention, the damping element is arranged on the actuation lever and/or the actuated lever.

10 Claims, 3 Drawing Sheets

(51) Int. Cl.

| | |
|---|---|
| ***E05B 77/38*** | (2014.01) |
| ***E05B 83/36*** | (2014.01) |

(56) References Cited

U.S. PATENT DOCUMENTS

| | | | | |
|---|---|---|---|---|
| 7,188,872 | B2 | 3/2007 | Kalargeros et al. | |
| 7,195,292 | B2 * | 3/2007 | Ketelsen | E05B 77/38 292/201 |
| 7,780,205 | B2 * | 8/2010 | Graute | E05B 77/38 292/201 |
| 8,888,150 | B2 * | 11/2014 | Nagaoka | E05B 77/38 292/341.12 |
| 9,810,007 | B2 * | 11/2017 | Bendel | B21D 53/38 |
| 10,030,420 | B2 * | 7/2018 | Jidaisho | E05B 81/16 |
| 10,196,841 | B2 * | 2/2019 | Kitamura | E05B 81/06 |
| 10,526,822 | B2 * | 1/2020 | Kitamura | E05B 77/38 |
| 2005/0062295 | A1 | 3/2005 | Ketelsen et al. | |
| 2016/0312498 | A1 | 10/2016 | Jidaisho | |

FOREIGN PATENT DOCUMENTS

| | | | | |
|---|---|---|---|---|
| DE | 202009015561 | U1 | 6/2011 | |
| DE | 102010023904 | A1 | 12/2011 | |
| DE | 102010034772 | A1 | 2/2012 | |
| DE | 102010046400 | A1 | 3/2012 | |
| DE | 102014004552 | A1 | 10/2015 | |
| EP | 1500762 | A2 | 1/2005 | |
| EP | 1500762 | B1 | 1/2005 | |
| EP | 2031164 | A2 * | 3/2009 | E05B 77/38 |
| JP | 2013130028 | A * | 7/2013 | |
| WO | 2006133673 | A1 | 12/2006 | |

* cited by examiner

DOOR LOCK, IN PARTICULAR MOTOR VEHICLE DOOR LOCK

This application is a national phase of International Application No. PCT/DE2020/100425 filed May 15, 2020, which claims priority to German Patent Application No. 10 2019 117 053.2 filed Jun. 25, 2019, the entire disclosures of which are hereby incorporated by reference.

FIELD OF DISCLOSURE

The invention relates to a door lock, in particular a motor vehicle door lock, comprising a locking mechanism substantially formed by a rotary latch and at least one pawl, further comprising a lever chain for directly or indirectly acting on the locking mechanism, the lever chain having at least one actuation lever and an actuated lever optionally acted upon by the actuation lever, and comprising at least one damping element for the lever chain.

BACKGROUND OF DISCLOSURE

Door locks and, in particular, motor vehicle door locks are typically equipped with a single locking mechanism consisting of a rotary latch and a pawl which secures the rotary latch. In the context of the present application, however, multiple locking mechanisms or multi-pawl locking mechanisms are also considered, i.e. locking mechanisms which are equipped with a rotary latch and, for example, two pawls, a comfort pawl and a blocking pawl securing the comfort pawl.

In the case of door locks and in particular motor vehicle door locks having a single locking mechanism, more or less pronounced "metallic" noises often occur during the closing process of the locking mechanism. These can be attributed to the fact that both the rotary latch and the pawl falling into the rotary latch are each equipped with metal stop surfaces in each case for safety reasons and for absorbing high tear forces caused by accidents. As a result, both a pre-locking position and a main locking position can usually be implemented.

In order to reduce the aforementioned metallic noises in such a locking mechanism and to suppress them as completely as possible, various approaches are known in the prior art. For example, EP 1 500 762 B1 operates with a damping means provided on the edge of at least one stop surface on the rotary latch and/or pawl. The damping center has a certain height with respect to the associated stop surface. As a result of the selected arrangement of the damping means on the edge of the stop surface, particularly effective damping is achieved. This has proven successful in principle.

A comparable damping means for the locking mechanism of a door lock and in particular a motor vehicle door lock is described in WO 2006/133673 A1. In this case, the locking mechanism is equipped with at least one cam, which interacts with a friction brake device in the course of assuming the closed position.

According to the invention, the cam and, if necessary, the rotary latch are noise-damped in order to further reduce the development of noise compared to previous designs with a simple design.

In addition to such noise-damped locking mechanisms, there are already approaches in the generic prior art according to DE 20 2009 015 561 U1 for equipping the lever chain acting directly or indirectly on the locking mechanism in a noise-dampening manner. For this purpose, the aforementioned utility model describes a motor vehicle door lock comprising at least one locking lever which assumes at least the two functional positions, "unlocked" and "locked." In addition, a stop is provided that defines the relevant functional position. The stop is formed on a rubber-elastic buffer which is supported on a housing.

The locking lever is specifically designed as an external locking lever and can be transferred into the previously mentioned functional positions by means of a lock cylinder, for example. In this way, the locking lever or external locking lever—indirectly—ensures that the locking mechanism is acted upon, specifically such that the end effect is that the locking lever, in the "unlocked" position thereof, allows the locking mechanism to be acted upon (via an additional and then mechanically closed actuation lever chain), in particular for opening, whereas the "locked" functional position corresponds to the fact that the lever chain or actuation lever chain, in the exemplary case in order to act on the locking mechanism, typically runs freely or is optionally blocked.

The locking mechanism can in particular be opened by means of such a lever chain or actuation lever chain. This can take place manually using an inner door handle or external door handle. It is also possible for the actuation lever chain to be acted upon in an electromotive manner. Since, in this context, individual or all levers of the lever chain are heavily loaded under certain circumstances, metal levers are usually used to provide the lever chain. These must not be coated on the contact surfaces thereof, in order to prevent wear and tear during the many-year service life. As a consequence of this, the previously mentioned "metallic noises" are possible when individual metal levers interact with one another. These occur, for example, when individual levers suddenly move away from one another, but are still elastically connected to one another via a spring which couples them, thus causing a "rebound" and the disruptive metallic noises in the region of the metal contact surfaces of said levers. Such a noise development is not effectively damped by the previously available prior art. This is where the invention comes in.

SUMMARY OF DISCLOSURE

The invention is based on the technical problem of further developing such a door lock and in particular a motor vehicle door lock such that particularly effective noise damping is provided for the lever chain.

In order to solve this technical problem, a generic door lock and in particular a motor vehicle door lock is characterized within the scope of the invention in that the damping element for the lever chain is arranged on the actuation lever and/or actuated lever.

In this context, the invention initially proceeds from the fact that the lever chain acting directly or indirectly on the locking mechanism can advantageously itself be designed to be noise-dampening. For this purpose, the damping element is arranged on the actuation lever or actuated lever. In the following, the actuation lever refers to the lever via which a movement is introduced or passed on into the lever chain, while the actuated lever is the lever which absorbs the movement of the actuation lever and in turn passes it on. In detail, the damping element is formed having a cavity which can be compressed in the actuation direction during actuation contact between the two levers. That is to say, as soon as the two levers of the lever chain interact with one another, and the mentioned actuation contact consequently occurs between the two levers, the cavity is compressed as part of the damping element, specifically in the actuation direction. The actuation direction is in this case specified by the actuation lever, which operates on the actuated lever in the actuation direction in order to apply movements to said lever in turn.

The cavity of the damping element is generally concavely curved with respect to the actuation direction. Therefore, as soon as the actuation lever moves against the actuated lever, the cavity of the damping element is compressed with the concave arcuate shape thereof in the actuation direction. This is typically achieved to the extent that or until two longitudinal walls of the damping element that define the curved cavity and enclose said cavity therebetween abut one another. Since the damping element is itself made of a resiliently compressible material, for example plastics material, a distinction can be made between a macromolecular deformation of the damping element and an intramolecular deformation by means of the provided cavity.

The plastics material used for the damping element is advantageously a thermoplastic plastics material, with, for example, polyethylene, polypropylene, polyester, polyamide, etc. having proven favorable. Such plastics materials can be processed particularly easily and in particular by a plastics injection molding process. This is advantageous because the damping means is usually designed as part of a plastics casing of a metal core of the actuation lever and/or of the actuated lever.

In any case, the interaction between the actuation lever and the actuated lever leads to the cavity initially being deformed as part of the damping element, specifically mostly until the longitudinal walls defining the cavity rest on or against one another. This is accompanied by a macromolecular or macroscopic deformation of the damping means. As soon as the longitudinal walls of the damping means made of the mentioned plastics material lie against one another, the damping means is still able to absorb elastic deformation in the actuation direction and provide noise damping in an unchanged manner. The plastics material used as a material is then usually deformed intramolecularly. In this case, individual chains of the plastics molecules are elastically deformed, which corresponds to relatively high damping rates compared to the macromolecular or macroscopic deformation when the cavity is compressed. As a result, at the beginning of the damping and in the actuation direction between the two levers, there is initially a slight damping which transitions into a continuously increasing damping after the compression of the cavity. This is expressly desirable.

In addition, the design is usually such that the cavity forms part of a buffer pocket. The buffer pocket or the damping means is generally arranged on the edge of an, in particular metal, contact surface. In this case, the damping element usually projects beyond the, in particular metal, contact surface in question, specifically mostly counter to the actuation direction. The contact surface can also be made of a plastics material or a multi-component material.

In detail, the design is also such that the damping element interacts with a damping stop, while a contact stop moves against the, in particular metal, contact surface. The damping stop and the contact stop are at a distance from one another in the actuation direction. Finally, the design is selected such that the damping element projects beyond the metal contact surface by an amount which is greater than the distance between the damping stop and the contact stop.

If, for example, the lever which is actuated or is to be actuated has the damping element, the damping stop and the contact stop are generally formed on the actuation lever. The damping stop and the contact stop are in this case located at the end of the actuation lever and are generally equipped with the metal contact surface. The actuated lever acted upon by the actuation lever also in turn has a metal contact surface or metal counter-contact surface.

In order for there to be no pronounced metallic noises in the event of, for example, metal contact between the actuation lever and the actuated lever and, moreover, for effective rebound damping to be available, the damping stop of the actuation lever first moves against the damping element. In this case, the contact stop on the actuation lever cannot (yet) reach the, in particular metal, contact surface or counter-contact surface on the actuated lever in the actuation direction. This is because the damping element on the actuated lever projects beyond the metal contact surface or counter-contact surface in question by the amount which is greater than the distance between the damping stop and the contact stop on the actuation lever.

Only when the damping stop on the actuation lever has compressed or deformed the damping element by a certain amount does the contact stop on the actuation lever come to rest against the, in particular metal, contact surface or counter-contact surface of the actuated lever. As a result, the movement of the actuation lever in the direction of the actuated lever is dampened and metallic noises are largely prevented or suppressed.

At the same time, this design ensures that, in the case of a return movement of the actuation lever after the described action on the actuated lever and an elastic coupling between the two levers, any movement of the two levers toward one another is again dampened by means of the damping element, such that effective rebound damping is also observed. This is all achieved taking into account a simple and inexpensive design because for this purpose only the damping means or the buffer pocket needs to be integrated into a plastics injection molding process, which is usually carried out in any case, when the actuation lever or the actuation lever is enveloped. The buffer pocket in this case can be injected onto the, in particular metal, core of the lever in question and designed as part of the plastics casing. The essential advantages can be seen herein.

BRIEF DESCRIPTION OF DRAWINGS

The invention is explained in greater detail below with reference to drawings which show only one exemplary embodiment and in which.

DETAILED DESCRIPTION

Figure 1:
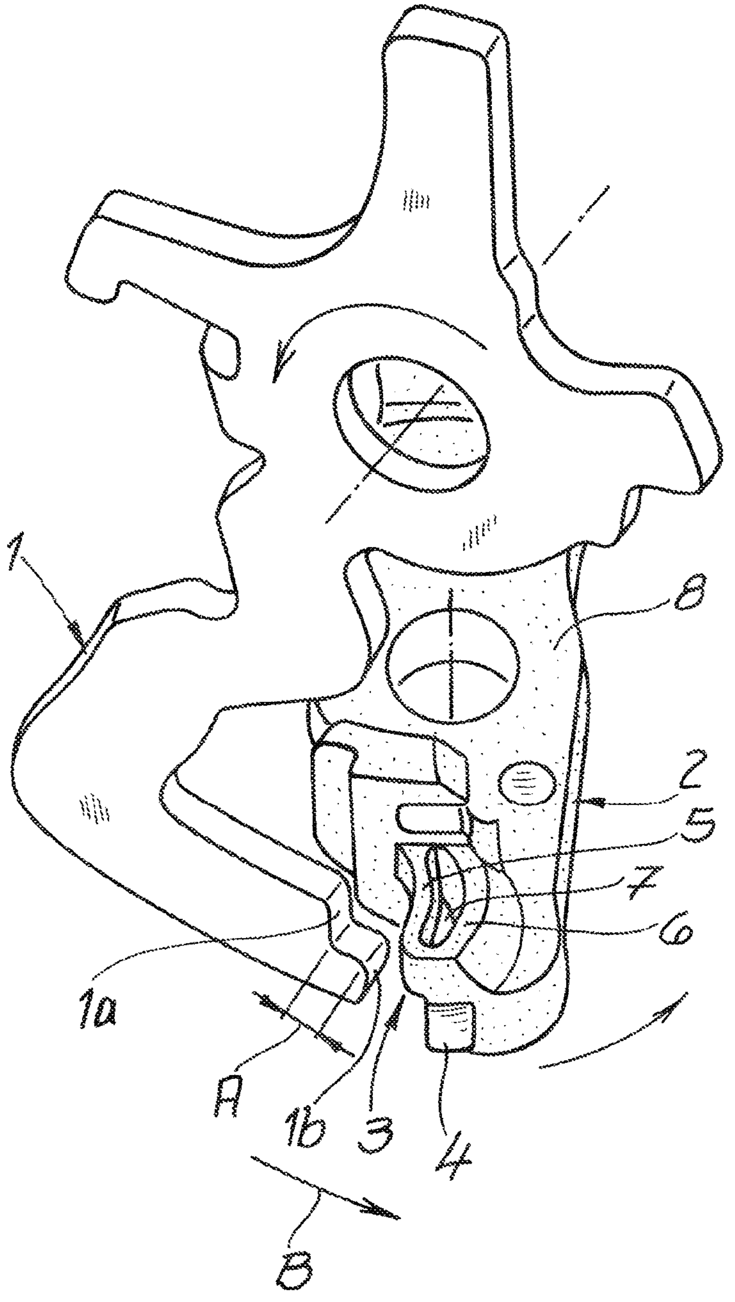
FIGS. 1 and 2 show the door lock according to the invention, and in particular the motor vehicle door lock, reduced to the components essential to the invention

The drawings show a door lock, which is not limited to a motor vehicle door lock. This door lock has a locking mechanism (not shown in greater detail) consisting substantially of a rotary latch and at least one pawl. A lever chain 1, 2 operates on the locking mechanism (not shown). The lever chain 1, 2 can generally be an actuation lever chain for acting on the locking mechanism in a manual and/or motorized manner. In principle, the lever chain 1, 2 shown in particular in FIGS. 1 and 2 in different perspectives can also be designed as a locking lever chain and in this case ensures that the locking mechanism is indirectly acted upon, as has been explained in the introduction to the description.

The basic design of the door lock or motor vehicle door lock in this case also includes at least one damping element 3 for the lever chain 1, 2. The damping element 3 can in this case be arranged on the actuation lever 1 and/or on the actuated lever 2 as part of the lever chain 1, 2. In fact, the design according to the exemplary embodiment is such that, by means of the actuation lever 1, the actuated lever 2 interacting therewith is acted upon, specifically pivoted. For this purpose, the actuation lever 1, for example in the view according to FIG. 1, can be pivoted about the axis thereof in the indicated counterclockwise direction. As a result, the end damping stop 1*a* and the contact stop 1*b* of the actuation lever 1 approaches an, in particular metal, contact surface 4 or counter-contact surface on the actuated lever 2.

The damping element 3 between the two levers 1, 2 is equipped with a cavity 7 which can be compressed in the indicated actuation direction B. The cavity 7 is in this case defined between two longitudinal walls 5, 6 of the damping element 3. The cavity 7 in question can be compressed in the actuation direction B, as indicated in particular in FIG. 3, which shows the compressed state of the cavity 7 in a dash-dotted line.

In fact, in the case of an interaction between the actuation lever 1 and the actuated lever 2 acted upon thereby, the cavity 7 in question is initially compressed, specifically until the two longitudinal walls 5, 6 rest against one another. In the case of longitudinal walls 5, 6 resting on one another, a further movement of the actuation lever 1 with respect to the actuated lever 2 in the actuation direction B, in addition to this initially macroscopic deformation of the damping means 3, leads to the plastics material used to provide the damping element 3 being intramolecularly elastically deformed, as has already been described in the introduction.

On the basis of the figures, it can be seen that the cavity 7 is concavely curved with respect to the actuation direction B; i.e. it is curved inward in the actuation direction B. In addition, the cavity 7 as a whole is designed as part of a buffer pocket. The entire damping element 3 is part of a plastics casing 8 which largely encloses a metal core 9 of the actuated lever 2 in the example. The metal contact surface 4, inter alia, is excluded from this. By contrast, the actuation lever 1 is preferably designed as a metal lever without such a plastics casing, such that both the damping stop 1*a* and the contact stop 1*b* of the actuation lever 1 are made of metal.

The damping element 3 is arranged on the edge of the, in particular metal, contact surface 4. In addition, on the basis of a comparison of FIGS. 1 and 3, it can be seen that the damping element 3 projects beyond the, in particular metal, contact surface 4 counter to the actuation direction B, specifically by an amount C. This amount C is in this case greater than a distance A between the damping stop 1*a* and the contact stop 1*b* on the actuation lever 1, specifically in the actuation device B.

The mode of operation is as follows. As soon as the actuation lever 1 is acted upon in a counterclockwise direction in accordance with the view in FIG. 1, specifically in a manual and/or motorized manner, for example, the end damping stop 1*a* moves in the direction of the damping element 3, while the contact stop 1*b* of the, in particular metal, contact surface 4 approaches the actuated lever 2. In this case, there is initially contact between the damping stop 1*a* on the actuation lever 1 and the damping element 3 or the longitudinal wall 5 thereof that faces outward and is concavely curved in the actuation direction B. This can be attributed to the fact that the damping element 3 projects beyond the, in particular metal, contact surface 4 of the actuated lever 2 by the amount C, which is greater than the distance A between the damping stop 1*a* and the contact stop 1*b* on the actuation lever 1. In any case, the damping stop 1*a* on the actuation lever 1 first moves counter to the damping element 3 or the concavely curved outer longitudinal wall 5 thereof.

Figure 2:
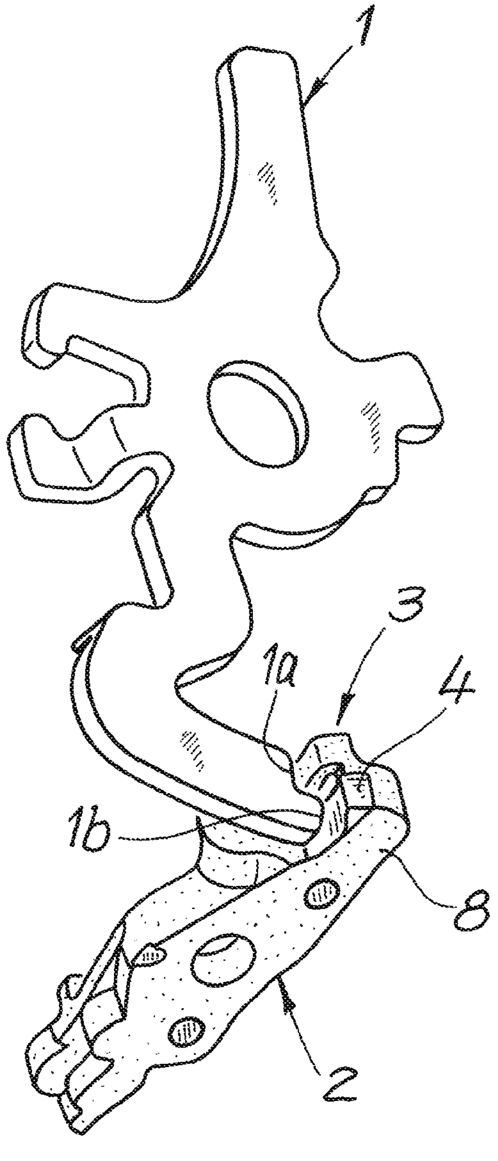
Figure 3:
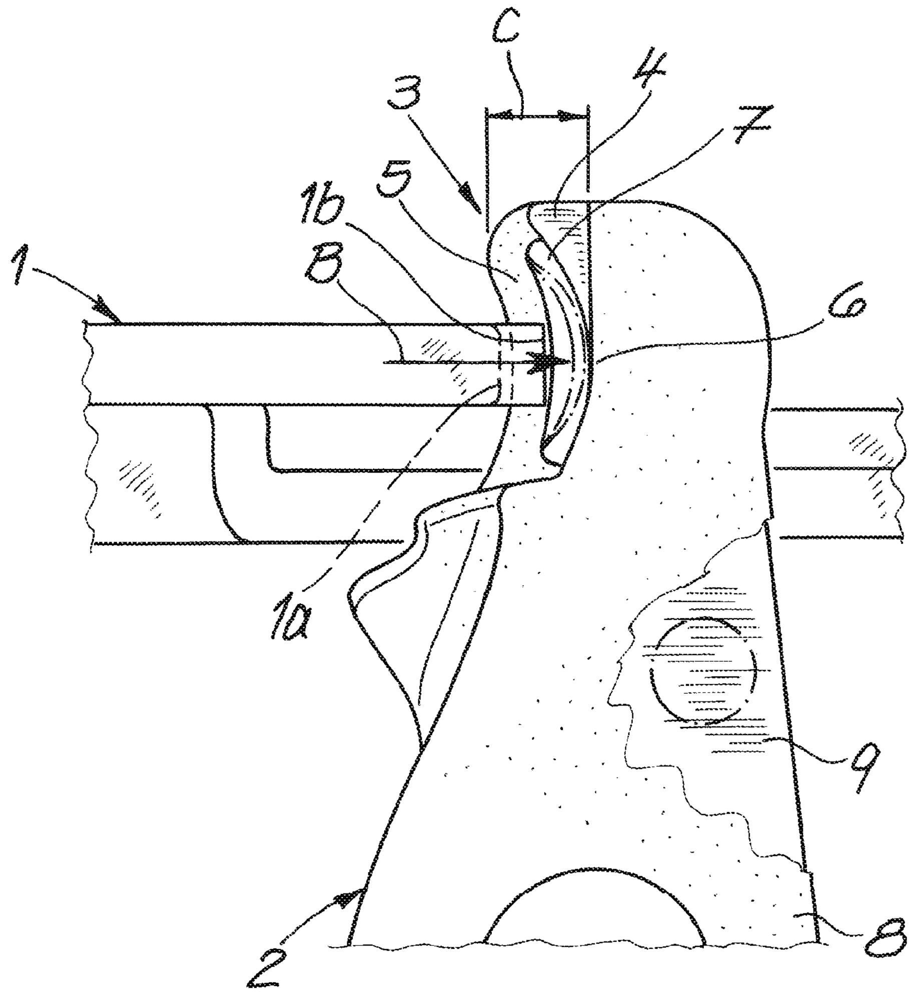
FIG. 3 is an enlarged view from FIGS. 1 and 2 in the region of a contact surface between the two primarily shown levers.

If the actuation lever 1 is further acted upon in the counterclockwise direction, the damping stop 1*a* resting against the concavely curved outer longitudinal wall 5 results in the cavity 7 between the two longitudinal walls 5, 6 being compressed, as indicated by the dash-dotted line in FIG. 3. After the actuation lever 1 has completed a certain damped path, the end contact stop 1*b* of said actuation lever moves against the, in particular metal, contact surface 4 or counter-contact surface on the actuated lever 2. Only now is the actuated lever 2 acted upon by the actuation lever 1, according to the exemplary embodiment in such a way that the actuated lever 2 executes a counterclockwise movement about the axis thereof that is indicated in FIG. 1.

During the damped movement of the actuation lever 1 as well as of the actuated lever 2 that is achieved in this way, the cavity 7 of the damping element 3 is initially compressed, specifically until the concave longitudinal walls 5, 6 which enclose the cavity 7 therebetween rest against one another. In most cases, the contact stop 1*b* at the latest then reaches the, in particular metal, contact surface 4 on the actuated lever 2. In principle, however, the plastics material of the damping element 3 can initially be further intramolecularly elastically deformed until the contact stop 1*b* on the actuation lever 1 has reached the metal contact surface 4 on the actuated lever 2. However, this is not shown in detail.

After the actuated lever 2 has been acted upon by the actuation lever 1, the actuation lever 1 is generally reset, for example by spring force. The same may apply to the actuated lever 2. In this case, the actuated lever 2 can be moved toward the actuation lever 1, which, for example, is in the basic position thereof. Such a rebound is then additionally damped by means of the damping element 3 between the two levers 1, 2, as, during this rebound process, the damping element 3 again ensures that the damping element 3 or the outer longitudinal wall 5 thereof initially comes to rest against the damping stop 1*a* of the actuation lever 1 and said rebound movement is dampened as a result. Metal contact between the contact stop 1*b* on the actuation lever 1 and the metal contact surface 4 on the actuated lever 2 is therefore not observed and prevented.

REFERENCE SIGNS

Actuation lever 1
Damping stop 1*a*
Contact stop 1*b*
Lever chain 1, 2
Lever 2
Damping element 3
Contact surface 4
Longitudinal walls 5, 6
Cavity 7
Plastics casing 8
Distance A
Actuation direction B
Amount C

The invention claimed is:

1. A door lock comprising:

a locking mechanism including a rotary latch and at least one pawl, a lever chain for directly or indirectly acting on the locking mechanism, the lever chain having at least one actuation lever and an actuated lever acted upon by the actuation lever in an actuation direction, and a damping element for the lever chain, wherein the damping element is arranged on the actuated lever, wherein:

the actuated lever includes a contact surface, the damping element includes a damping surface that extends from the actuated lever a first distance from the contact surface in the actuation direction, and the damping surface and the contact surface form a first stepped configuration, the actuation lever includes a contact stop positioned for engaging the contact surface and a damping stop positioned for engaging the damping surface, and the contact stop and the damping stop form a second stepped configuration, the contact stop is a second distance from the damping stop in the actuation direction, and the first distance is larger than the second distance such that in actuation contact between the actuation lever and the actuated lever, the first and second stepped configuration engage such that the contact stop on the actuation lever is disengaged from the contact surface on the actuated lever until the damping stop engages the damping surface to deform the damping element in the actuation direction.

2. The door lock according to claim 1, wherein the damping element is formed having a cavity and the cavity is compressed in the actuation direction during actuation contact between the actuation lever and the actuated lever.

3. The door lock according to claim 2, wherein the cavity is concavely curved with respect to the actuation direction.

4. The door lock according to claim 2, wherein the cavity forms part of a buffer pocket.

5. The door lock according to claim 1, wherein the damping element is arranged at an edge of the actuated lever.

6. The door lock according to claim 1, wherein the damping element projects beyond the contact surface counter to the actuation direction.

7. The door lock according to claim 1, wherein the damping element is part of a plastic casing which completely or partially encloses a metal core of the actuated lever.

8. The door lock according to claim 1, wherein the damping element is made of a plastic material that elastically deforms.

9. The door lock according to claim 2, wherein the cavity is defined between two longitudinal walls of the damping element.

10. The door lock according to claim 1, wherein the contact surface is a metallic contact surface.

* * * * *